(12) United States Patent
Rossi et al.

(10) Patent No.: US 6,873,702 B1
(45) Date of Patent: Mar. 29, 2005

(54) TELEPHONE SUBSCRIBER SYSTEM

(75) Inventors: Walter Rossi, Pozzo d'Adda (IT);
Ferdinando Lari, Vimercate (IT);
Carlo Antonini, Vanegono Inferiore
(IT); Pietro Consiglio, Milan (IT);
Luigi Vergani, Agrate Brianza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/475,804

(22) Filed: Dec. 30, 1999

(30) Foreign Application Priority Data

Dec. 31, 1998 (EP) .............................. 98830808

(51) Int. Cl.[7] .......................... H04M 1/00; H04M 9/00; H04M 9/08
(52) U.S. Cl. .................. 379/399.01; 379/401; 379/413; 379/413.01; 379/412
(58) Field of Search ....................... 379/399.01, 399.02, 379/401, 402, 403, 404, 405, 412, 413, 413.01, 413.02

(56) References Cited

U.S. PATENT DOCUMENTS

| | | | |
|---|---|---|---|
| 4,578,541 A | | 3/1986 | Dodds |
| 5,247,573 A | | 9/1993 | Reichelt |
| 5,323,461 A | | 6/1994 | Rosenbaum et al. |
| 5,706,343 A | | 1/1998 | Saviotti |
| 5,796,815 A | * | 8/1998 | Guercio et al. .............. 379/372 |
| 6,104,794 A | * | 8/2000 | Hein et al. |

* cited by examiner

*Primary Examiner*—Duc Nguyen
(74) *Attorney, Agent, or Firm*—Lisa K. Jorgenson; Robert Iannucci; Seed IP Law Group PLLC (57) ABSTRACT

A subscriber's telephone system is presented that includes at least one driver circuit connected to Tip and Ring terminals. An additional network is connected between an output of the driver circuit and the Ring terminal. This additional network includes a suitably dimensioned capacitor and a diode limiter connected in parallel with each other to minimize the overall voltage while maintaining a desired battery mean value.

15 Claims, 14 Drawing Sheets

TELEPHONE SUBSCRIBER SYSTEM

TECHNICAL FIELD

This invention relates to a subscriber's telephone system, and more particularly to a circuit for driving a telephone line.

BACKGROUND OF THE INVENTION

The invention relates particularly but not exclusively to a telephone system which includes a Subscriber Line Interface Circuit (SLIC), and the ensuing description will make reference to this field of application for convenience of explanation. This applicant has been particularly prolific in this area, acquiring several patents, for instance U.S. Pat. No. 5,461,670, and U.S. Pat. No. 5,706,343, hereby incorporated by reference.

A telephone system usually comprises a user outlet (i.e., a subscriber's telephone set), a connection element (such as a T-Tip and R-Ring pair), and a telephone exchange. The telephone exchange incorporates suitable equipment to serve all the basic functions of a telephone system, best known in the art as BORSCHT, an acronym for "Battery, Overvoltage protection, Ringing, Supervision, Coding, Hybrid, Test".

The features of these basic functions are well known to the skilled persons in the art and their discussion has been abbreviated or eliminated for brevity. However, some basic information is provided to frame the context of the invention.

The exchange is switched whenever a telephone subscriber dials a phone number. In particular, the number is sent to the exchange in either the form of pulses or audio tones; the exchange recognizes the dialled number and sends off a so-called "ringer" signal to inform the called phone set, i.e., the phone set that corresponds to the dialed number, of the existence of the call. Simultaneously with that ringer signal, an acknowledge signal is activated to inform the calling subscriber that the call is being processed.

Telephone sets have been equipped with signalling mechanisms of the above types from the very beginning. Specifically, the so-called "biased ringer" is still in use today which was invented by Watson in 1878; this signalling mechanism is actuated by an AC voltage having a frequency of 20 to 50 Hz and amplitude of about 90 Vrms, this amplitude being made necessary by the inefficiencies of magnetic materials and transmission lines which are parts of the telephone system.

A less stringent need of a substantial amplitude for the control signal of the call addressing signal still exists in current apparatus.

In particular, conventional sets employ an AC ringer signal which is usually produced at the telephone exchange by a DC motor driving an AC generator. Alternatively, this signal may be provided by an inverter, e.g. a solid-state inverter, capable of producing an AC voltage from a DC voltage, with no moving parts being used. In either constructions, a nominal exchange voltage of −48 VDC is typical.

The AC signal can then be sent to the line in a burst form modulated at a predetermined rate, either through the contacts of a relay controlled from a switch or directly from a suitable line interface.

The specifications for the ringer signal are provided by the regulatory bodies of the individual countries. A common provision relates to the issuing of the signal in either a balanced or an unbalanced manner.

Figure 1:
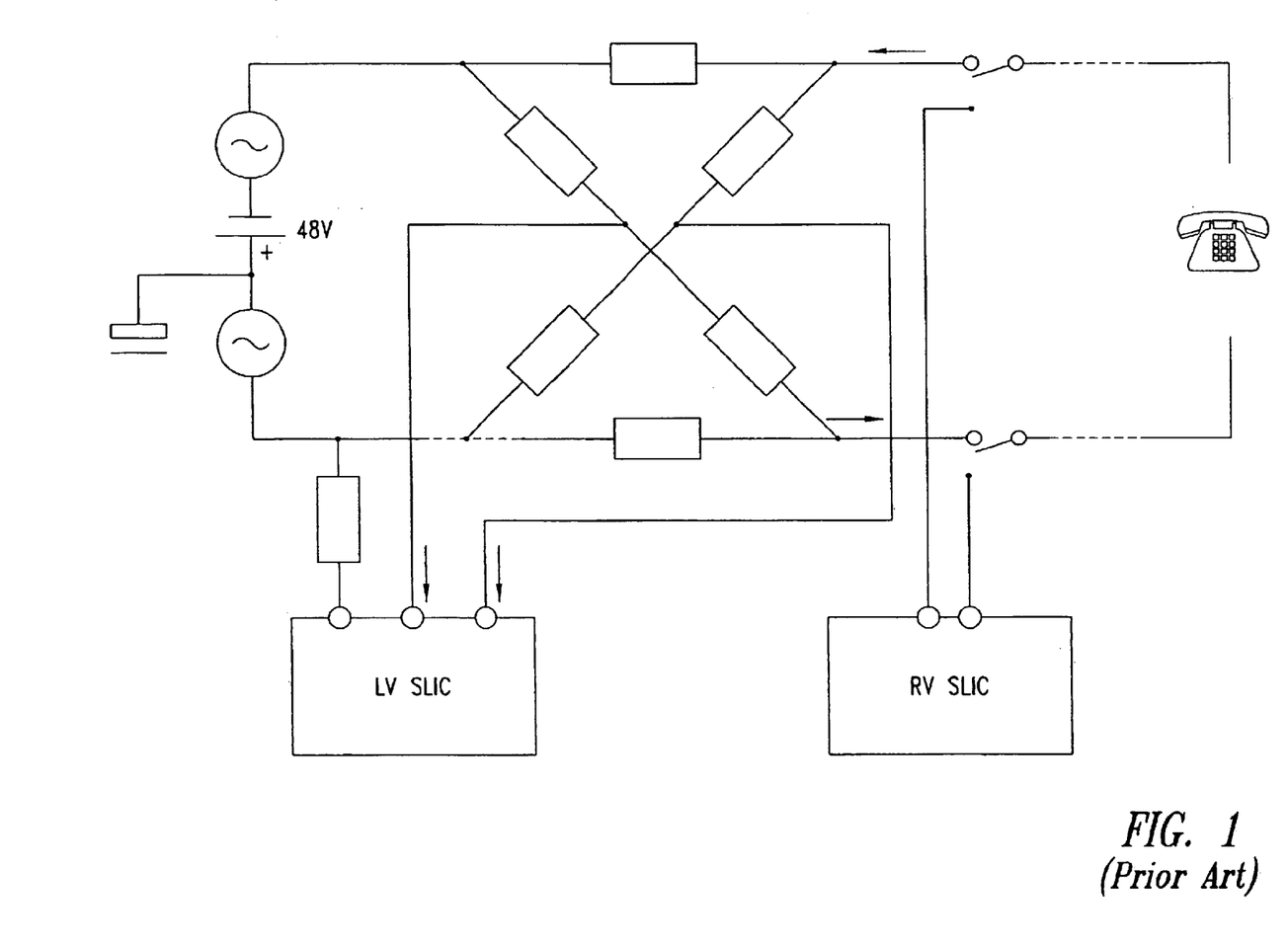
FIG. 1 is a schematic diagram illustrating sending a ring signal in a balanced manner.
Figure 2A:
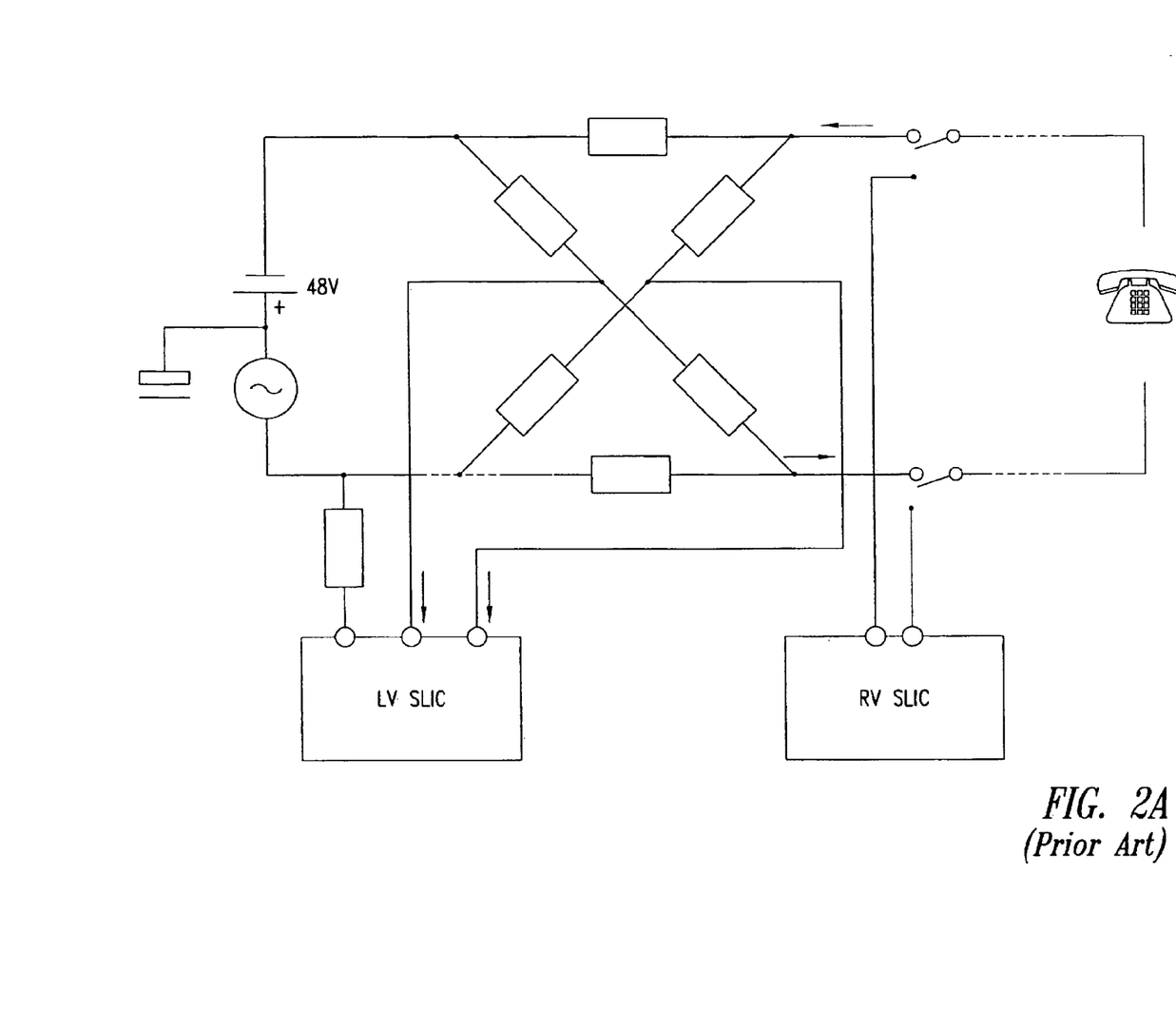
FIGS. 2A and 2B are schematic diagrams illustrating sending a ring signal in an unbalanced manner.
Figure 2B:
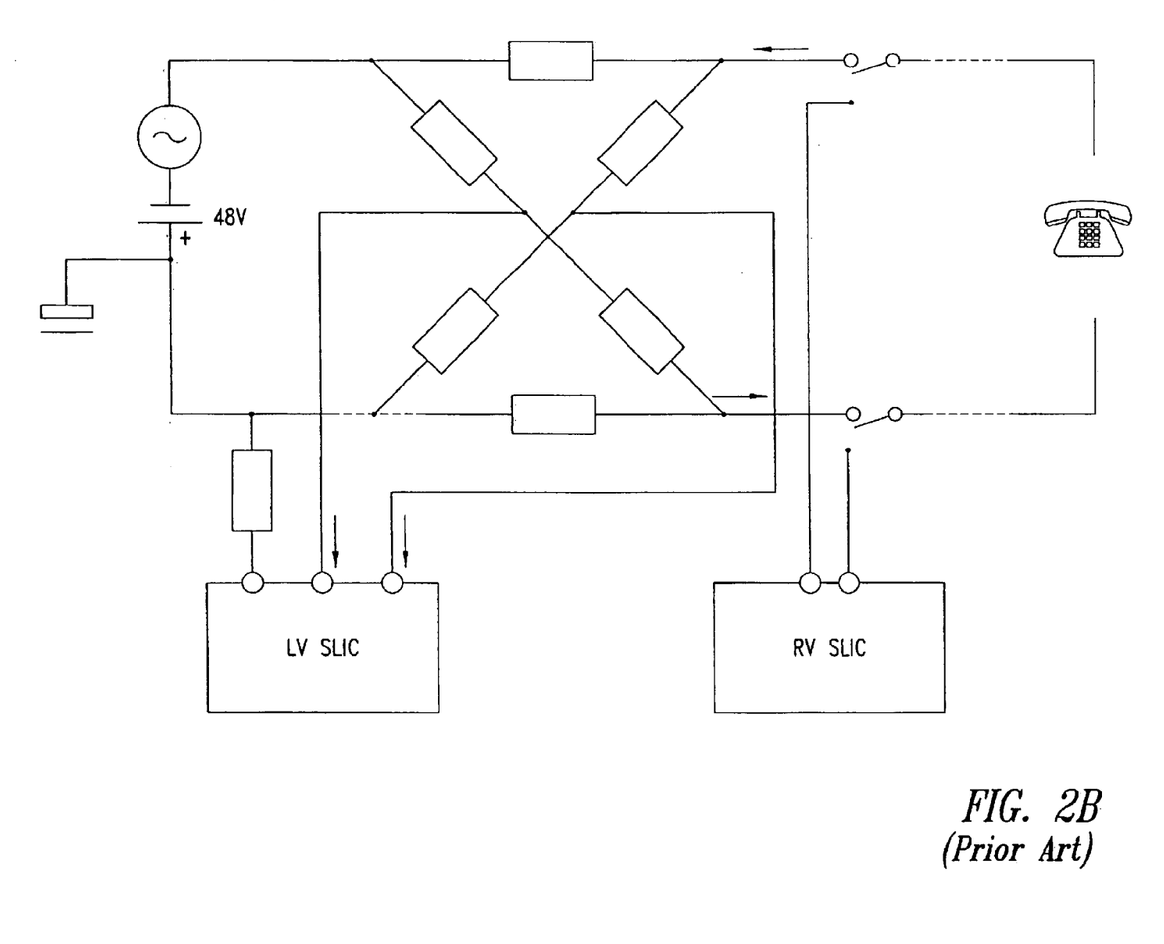

Illustrated in FIG. 1 by way of example is the sending of a ringer signal in a balanced manner, and in FIGS. 2A and 2B the sending of the same in an unbalanced manner. In either of the above examples, the signal is placed on the line by means of a special relay 1, as is done in currently available apparatus.

It should be noted that, in conventional systems, the ringer signal is sent to the line in an unbalanced manner and overlaps the battery or supply voltage signal (typically of −48 VDC). However, this is impracticable where the apparatus are electronic throughout, due to the high voltages involved being difficult to control unless the silicon area to be given up to the integration of the whole system were expanded to a very large size, which is impractical to produce.

A prior approach to suppressing the ring relay consists of adopting a bridge configuration for the SLIC interface construction, and using for the ringer signal the same drive elements that are used for the other modes of operation of the telephone system.

In particular, a bridge type of SLIC interface provides for the ringer signal to be sent to the line in the balanced manner, being overlapped by a DC voltage of about 22 Volts effective to detect the trigger or off-hook signal from the telephone subscriber set.

Figure 3:
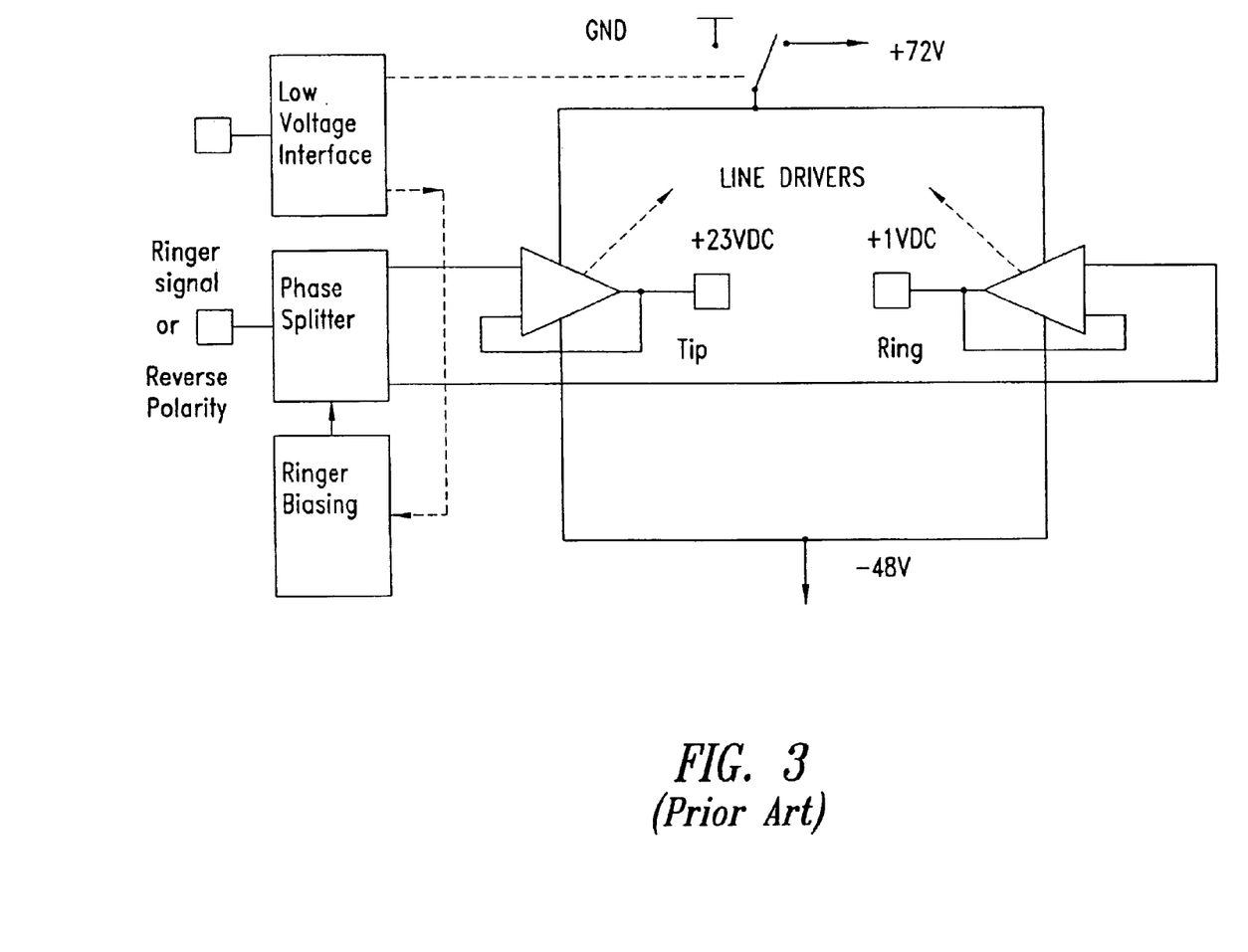
FIG. 3 is a schematic diagram showing a SLIC interface in a bridge configuration according to the prior art.

FIG. 3 is a schematic diagram of a bridge type of SLIC interface which complies with established standards for both public and private applications on issues of amplitude and distortion of the issued signal.

Where very stringent requirements apply to amplitude and/or distortion, as is the case with short loop networks, the ringer signal can be generated directly from the SLIC interface utilizing the so-called reverse-polarity function. In fact, by using a low-level (0 logic level) square wave control signal having the same frequency as the ring frequency (typically 20 to 50 Hz), the drive elements can be driven as appropriate to obtain on the line a reversal of polarity at ring frequency, as shown schematically in FIG. 4.

Figure 4:
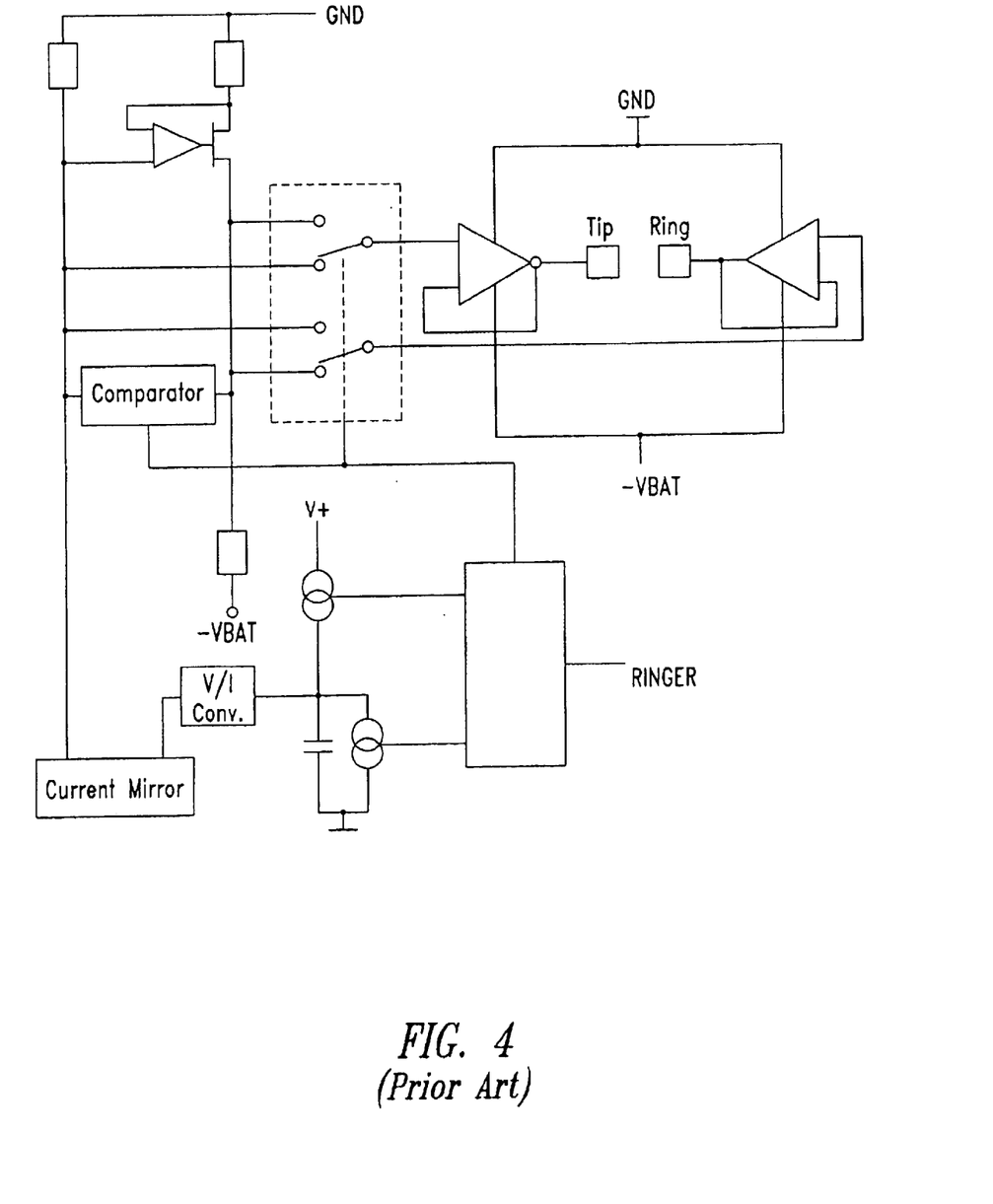
FIG. 4 is a schematic diagram showing a SLIC circuit utilizing the so-called "reverse polarity" function.

In this case, the transactions can be controlled by means of a suitable capacitor which brings the line waveform close to a trapezoidal form, to thereby control the peak factor FC, given as $$FC = V_p/V_{rms} \quad (1)$$

Figure 5:
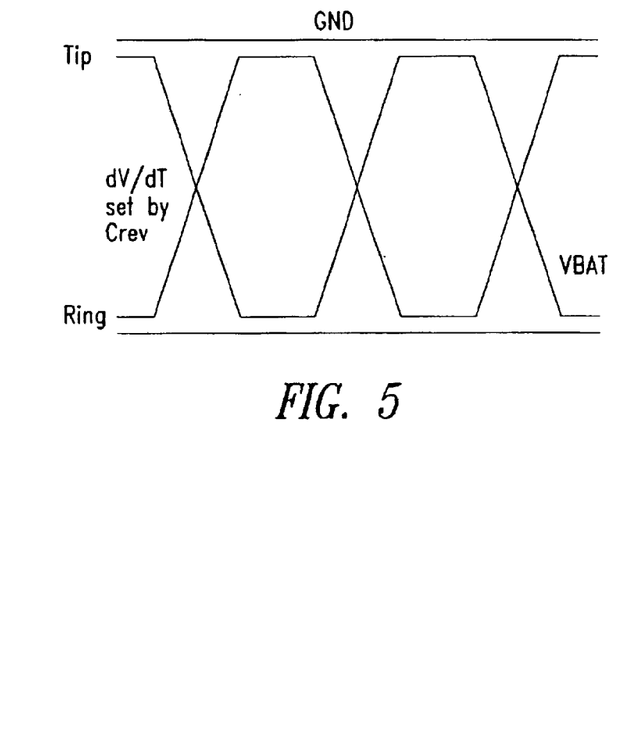
FIG. 5 is a graph showing the behavior of a low-level square wave control signal for producing reverse line polarity.

In this case, the balanced ringer signal shown in FIG. 5 is obtained.

Where compliance with the standards covering access to an ISDN network is required, such as Italy Telecom Technical Manual No. 1499, relating to large scale ISDN, it is important that the ringer signal be sent to the telephone line in an unbalanced manner and at a mean value equal to the battery level.

SUMMARY OF THE INVENTION

Embodiments of this invention provides a device for generating an integrated ringer signal without the need of a relay, and in compliance with relevant regulations. In particular, an advantage of embodiments of this invention is to provide a device capable of sending a ringer signal to the telephone line whose mean value equals the battery level, primarily through the use of a SLIC interface integrated in a single device and of technologies based on least working voltage for a given performance.

Embodiments of the invention provide an additional network coupled between an output of the driver circuit and the ring, and includes a capacitor of a suitable size and a diode limiter in parallel with each other, thereby minimizing the overall voltage while maintaining a desired mean battery value.

Provided is a subscriber telephone system including at least one driver circuit connected to Tip and Ring terminals. The subscriber system includes an additional network connected between an output of the driver circuit and the ring terminal, where the new network has a suitably dimensioned capacitor and a diode limiter connected in parallel with each other to minimize the overall voltage while maintaining a desired battery mean value.

The features and advantages of a device according to the invention will be apparent from the following description of an embodiment thereof, given by way of non-limitative example with reference to the accompanying drawings.

DETAILED DESCRIPTION

The ring signal injection function is obtained, as previously explained in connection with the prior art (FIG. 3), by means of a DC unbalance in the voltage between the Tip and Ring wires. In particular, the ring signal is sent into the line drivers in a differential manner through the phase splitter.

In this way, the maximum voltage that the SLIC circuit is able to sustain in order to provide the injection function can be calculated. Referring to FIG. 3, assume that: VDC is the required DC voltage difference between the Tip and Ring wires; VDROP is the voltage allowance appropriate to cause all the stages (essentially the final stages) to operate in a linear mode for minimum distortion; and VRINGER is the AC voltage (rms value) to be produced across the load. If these assumptions are made, then the minimum battery voltage will be:

$$VBATmin = VDC + VDROP + VRINGERpeak \quad (2)$$

Substituting actual figures such as, for example, VDC= 20V, VDROP=3V (each side), and VRINGER=50 Vrms– >70.5 Vpeak, it is found that a minimum battery voltage is:

$$VBATmin = 20 + 6 + 70.5 = 96.5V$$

It should be considered that this value does not include the voltage drops across the protection and sensing resistors, which have not been included in this computation, nor does it include battery and process spreads, as well as various factors that can affect the outcome.

It will be explained hereinafter that a technology can be used which provides a lower maximum working voltage than calculated, for a given performance.

Figure 6:
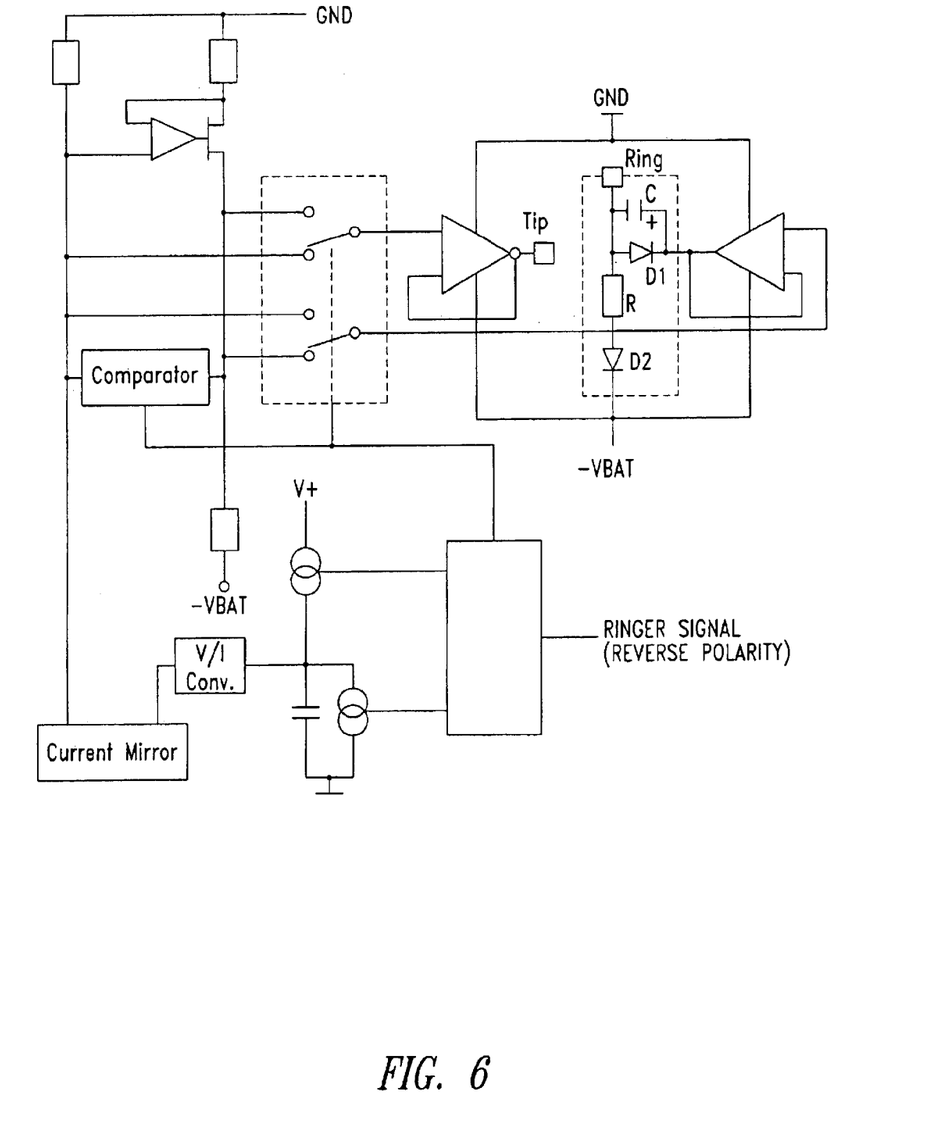
FIG. 6 is a schematic diagram showing a SLIC interface according to an embodiment of the invention.

A technical expedient which is resorted to in many practical applications involving a reverse polarity function in short loop networks, and is effective to minimize the overall voltage despite a mean battery value being supplied, is shown in FIG. 6. In this case the additional network connected between the driver output and the ring wire allows a DC shift by a voltage value equal in magnitude to the AC signal produced at the driver outputs, using a capacitor C of appropriate size.

Figure 7:
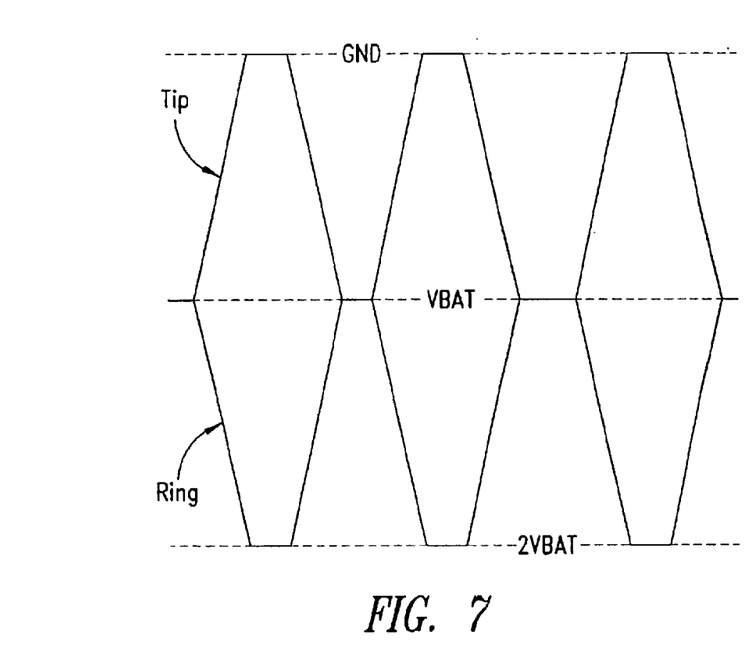
FIG. 7 is a graph showing the behavior of internal signals of the circuit in FIG. 6.

On the Ring wire, the voltage switches theoretically between a value −2×VBAT and a value −VBAT, while on the Tip wire, the voltage normally switches between GND and −VBAT, as shown in FIG. 7.

Advantageously in this embodiment, the capacitor C is sized to bring the signal attenuation down to an acceptable value, and for operation at relatively high voltages.

A diode D1 is connected in parallel to the capacitor C and allows the SLIC to perform properly when in the speech mode of operation. In this case, a DC current would flow from the terminal Tip (the more positive potential) to the terminal Ring (the more negative potential), and the diode D1 would be forward biased, thus having a low resistance that shorts out the capacitor C.

A resistor R connecting the driver outputs to the voltage reference −VBAT is necessary in order to define the time constant for settling the function. Its value cannot, therefore, be reduced indefinitely because it might alter the SLIC electrical characteristics (longitudinal-transverse conversion).

Another diode D2 allows a voltage shift to be obtained by differentiation of the circuit time constants. These time constants have a value RC during the charge, and a virtually infinite value during the discharge.

Calculating the minimum battery voltage, it is found that:

$$VBATmin = 70.5 + 3 = 74V,$$

assuming a drop of 1.5V each side.

The accompanying distortion is worse than in the previous instance, but a knowing choice of the shift can keep its value within the specifications of the Italian specification noted above.

This embodiment achieves its objectives but cannot fill another system demand, i.e., that for transmission of information during the on-hook time period, for instance information regarding caller identification or information. It should be recalled that the on-hook transmission function can either occur at the start of the ringer signal issuing or during the first signal halt (between the first burst and the second). In this case, no DC current would be flowing (Iloop=0 mA), and the diode D1 would be unbiased, thereby causing the data transmission to be altered.

Figure 8:
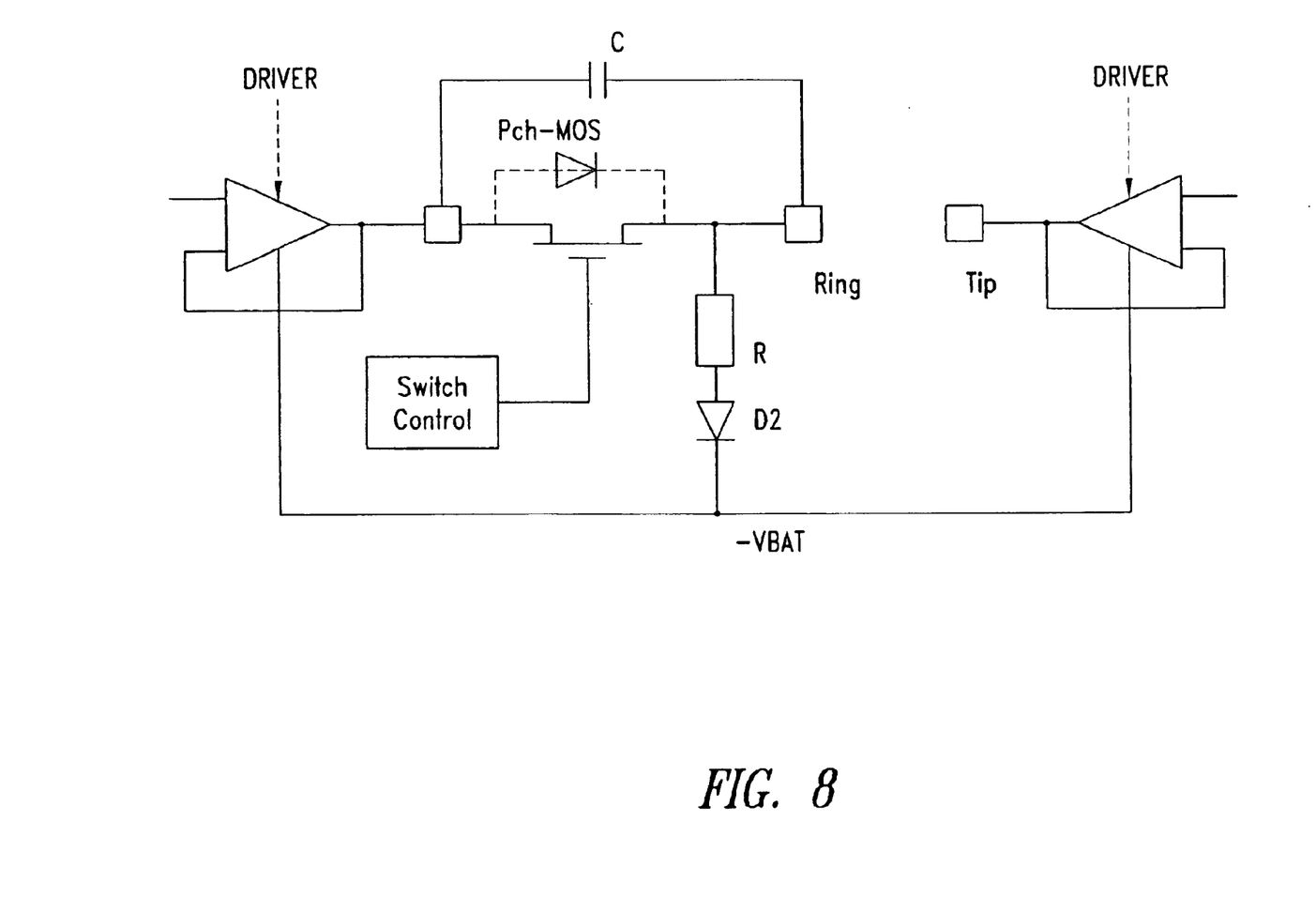
FIG. 8 is a schematic diagram showing a modified embodiment of a detail of the circuit in FIG. 6.

To overcome this drawback, which only affects on-hook transmission, the network has been further improved as shown in FIG. 8. The diode D1 has been conveniently replaced with a P-channel MOS transistor, which is a normally provided component with BCD technologies and capable of operating in conformity with the process set voltages.

A function of this P-channel MOS transistor is that it inherently includes a diode in its structure, which diode can effectively replace the diode D1 of the previous example, at the same time as it can operate as a switch to short out the diode (D1) during on-hook transmission in order to have the data transmitted correctly.

A peculiar feature of this solution is that it can be fully integrated (except for the capacitor C, of course) to BCD processes. In fact, assuming that the process of choice can be run on battery voltage (−VBAT), no voltage in excess of −VBAT would ever be applied across any individual components. Although producing a voltage of −2×VBAT on the Ring wire, the P-channel MOS transistor is operated at the same voltage as −Vbat.

Figure 9:
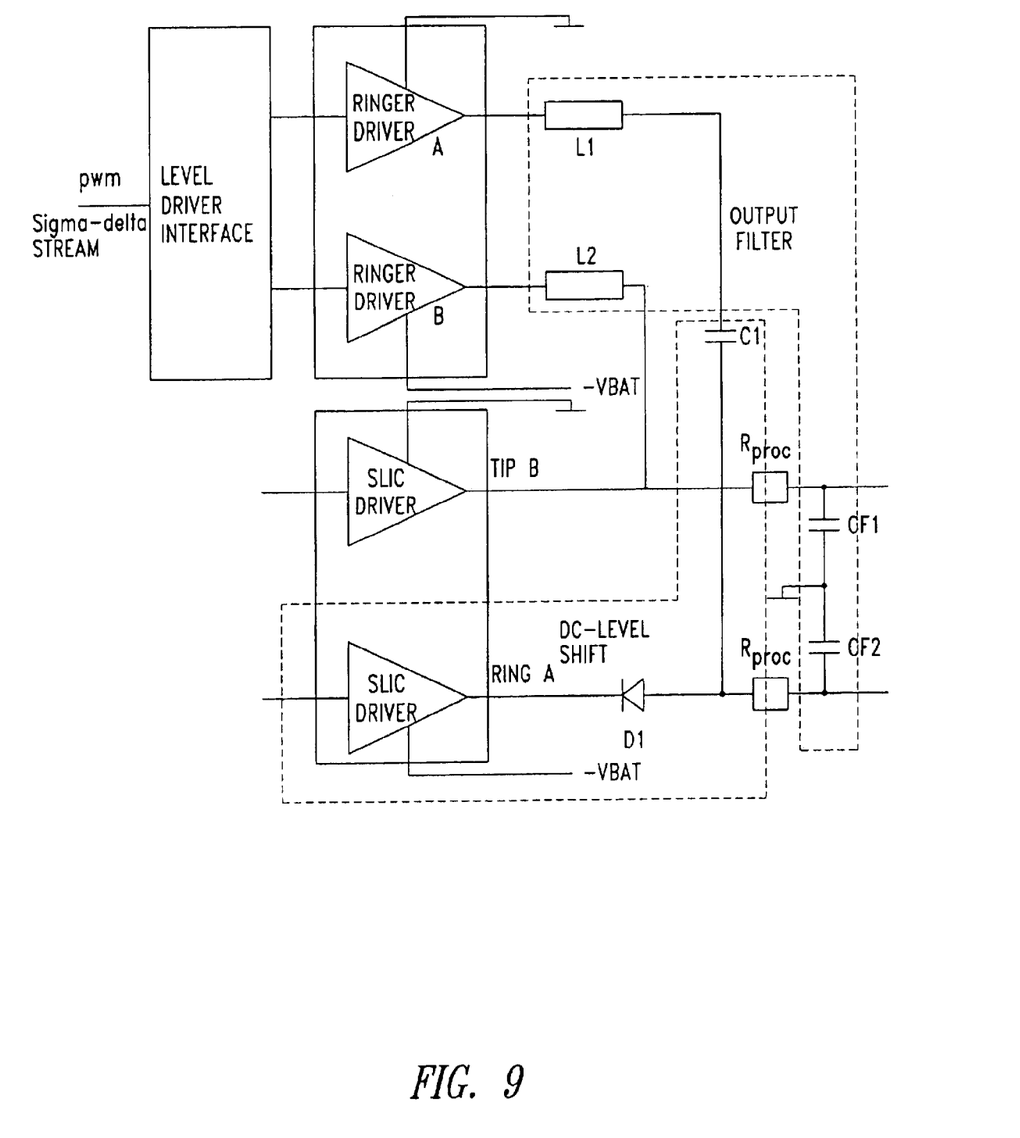
FIG. 9 is a schematic diagram showing another detail of the circuit in FIG. 6.

A further circuit embodiment, particularly useful for terminating an ISDN network which additionally incorporates two drivers dedicated to implementing the ring function, is shown in FIG. 9.

In particular, this figure shows schematically a simpler circuit that exhibits low power dissipation, this being a major feature of an ISDN termination.

In this case, the additional ringer drivers A and B are only active during the ring function, and are conveniently driven on/off in an appropriate logic sequence. This sequence may be of the PWM type or, alternatively, derived from a sigma-delta type of modulation.

In this way, the system dissipation can be minimized, the re-construction of the low-frequency ringer signal being effected by means of an external filter, e.g., of the LC type.

Regarding generating the AC signal with a battery DC mean value, FIG. 9 again shows the diode D1, for simplicity, although a P-channel MOS transistor could be substituted for it, as explained above with reference to FIG. 8.

The block 'Level Driver Interface' functions to interface the input logic signal, of either the PWM or the sigma-delta type, so as to correctly match it to the drive levels of the final drivers being supplied between GND and −VBAT.

The ringer drivers A/B, which are only active at the ringing stage, serve to amplify the input logic signal to produce switching between GND and −VBAT, while the system formed of L1-L2-CF1-CF2 provides the external filter for extracting the sinusoidal ringer signal.

The network which produces a mean DC ring value overlapping a balanced AC signal includes the capacitor C1 as before, the diode D1 which may be replaced with a P-channel MOS transistor for on-hook transmission, and the SLIC driver (Ring A).

The SLIC driver (Ring A) is used as a voltage restorer in place of the resistor R1 previously provided, and is effective to minimize the time constant. At this stage, the SLIC driver −Tip B would be in the off, i.e. high impedance, state. The removal of the resistor R1 carries a beneficial effect during the conversion step as well, when the ringer drivers would be off and deterioration of the longitudinal-transverse conversion due to the presence of the resistor R1 prevented.

During the normal converting step, the associated drivers (SLIC drivers) are closed to an additional AC load represented by a series of first and second capacitors CF1 and CF2, usually well tolerated. The inductive elements of the filter, in combination with the capacitors, are instead disconnected, which is obviously beneficial in terms of flexibility and compensation of the system.

If the circuit balance due to the presence of the P-channel MOS transistor is to be further optimized, then a similar component may be also added to the SLIC driver (Tip B).

Shown in FIGS. 10, 11, 12, 13 and 14 are some lab-obtained waveforms using a voltage Vbat of 40V, compatible with the technology employed for forming the drivers considered. The load is represented by a 3EUREN equivalent network (660 Ohms in series with a 3 $\mu$F capacitor) connected between the Tip and Ring wires.

Figure 10:
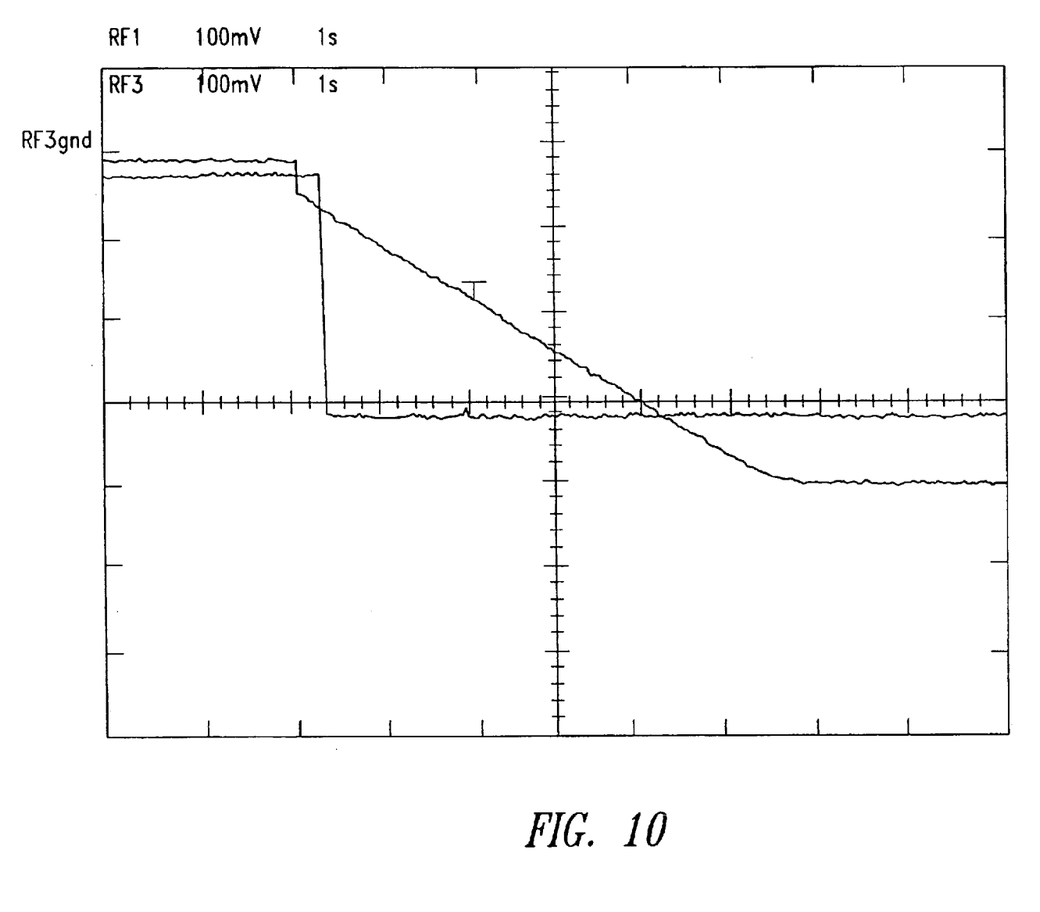
FIGS. 10, 11, 12, 13 and 14 are graphs showing internal waveforms of the interface circuit according to an embodiment of the invention, as obtained in the laboratory.

Shown in FIG. 10 is the effect of the SLIC driver (Ring A) on the charge constant of the capacitor C1 (for example 47 $\mu$F) first with the driver in the off state (the equivalent of an infinite resistance R) and then with the driver in the on state (the equivalent of a resistance R equal to Ron—a few tens of Ohms).

Figure 11:
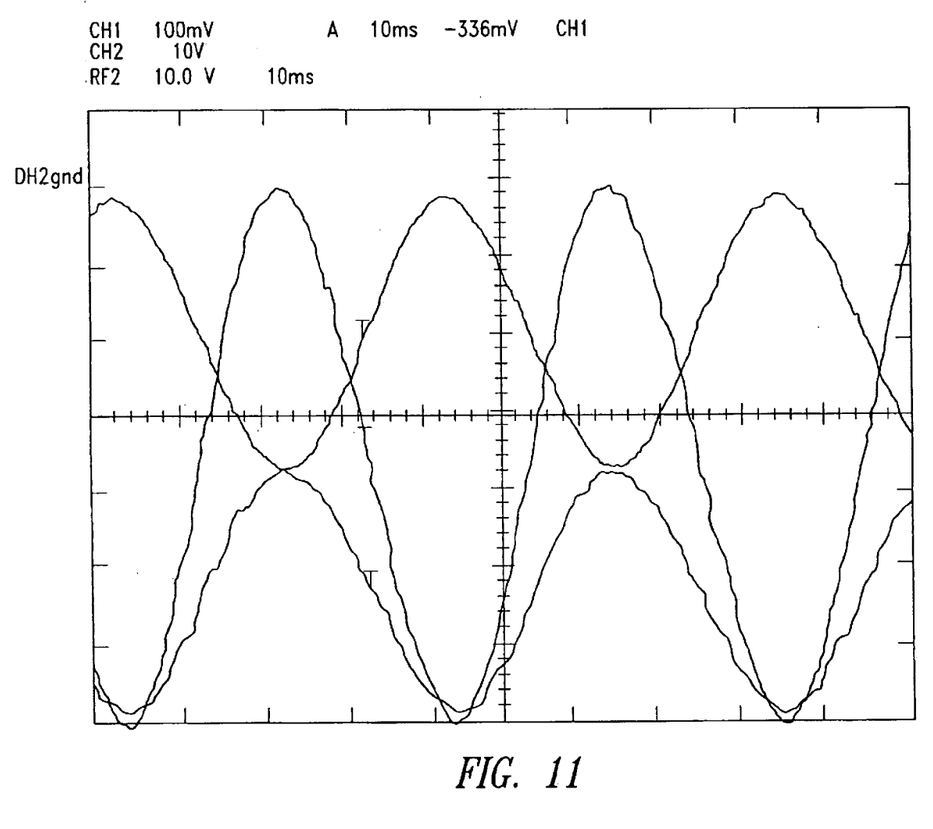

FIG. 11 shows the individual waveforms on the Tip and Ring wires, and the differential value of the AC signal, which exhibits a smaller distortion than 3%. The waveforms represent the voltage accurately, but are distorted by the oscilloscope type employed. In this condition, the SLIC driver is off.

Figure 12:
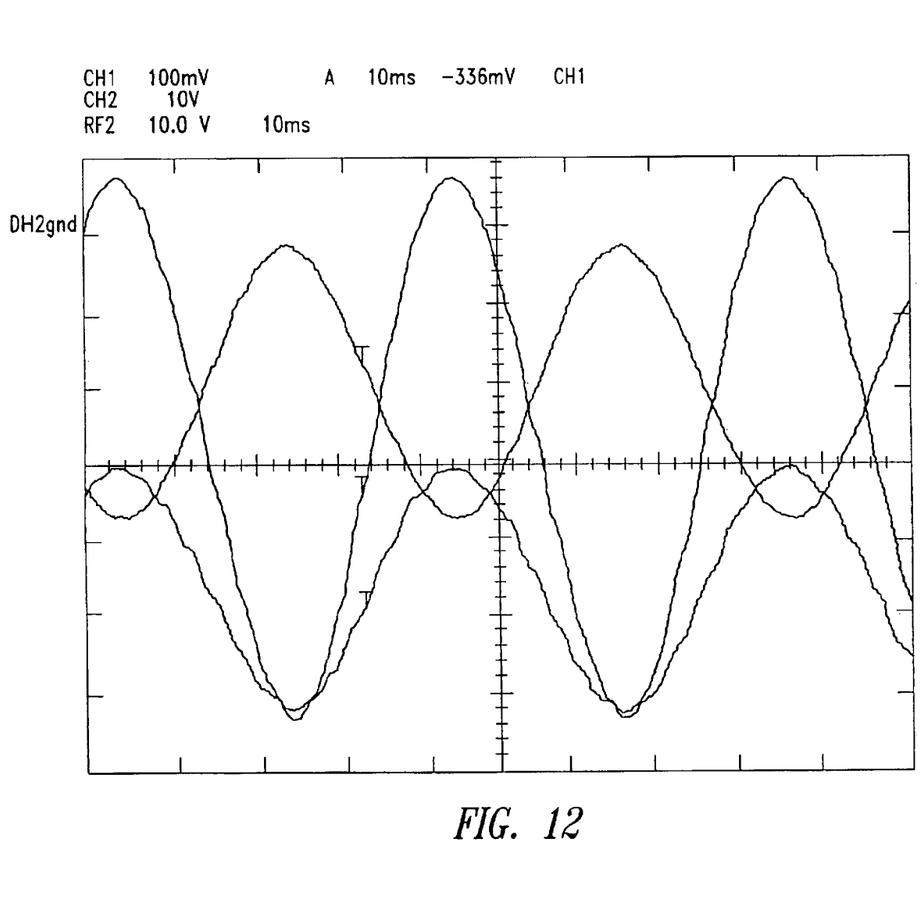

Shown in FIG. 12 are the same waveforms as in FIG. 11, but with the SLIC driver turned on. The slight voltage shift effect due to the SLIC driver imposing a different reference can be appreciated.

Figure 13:
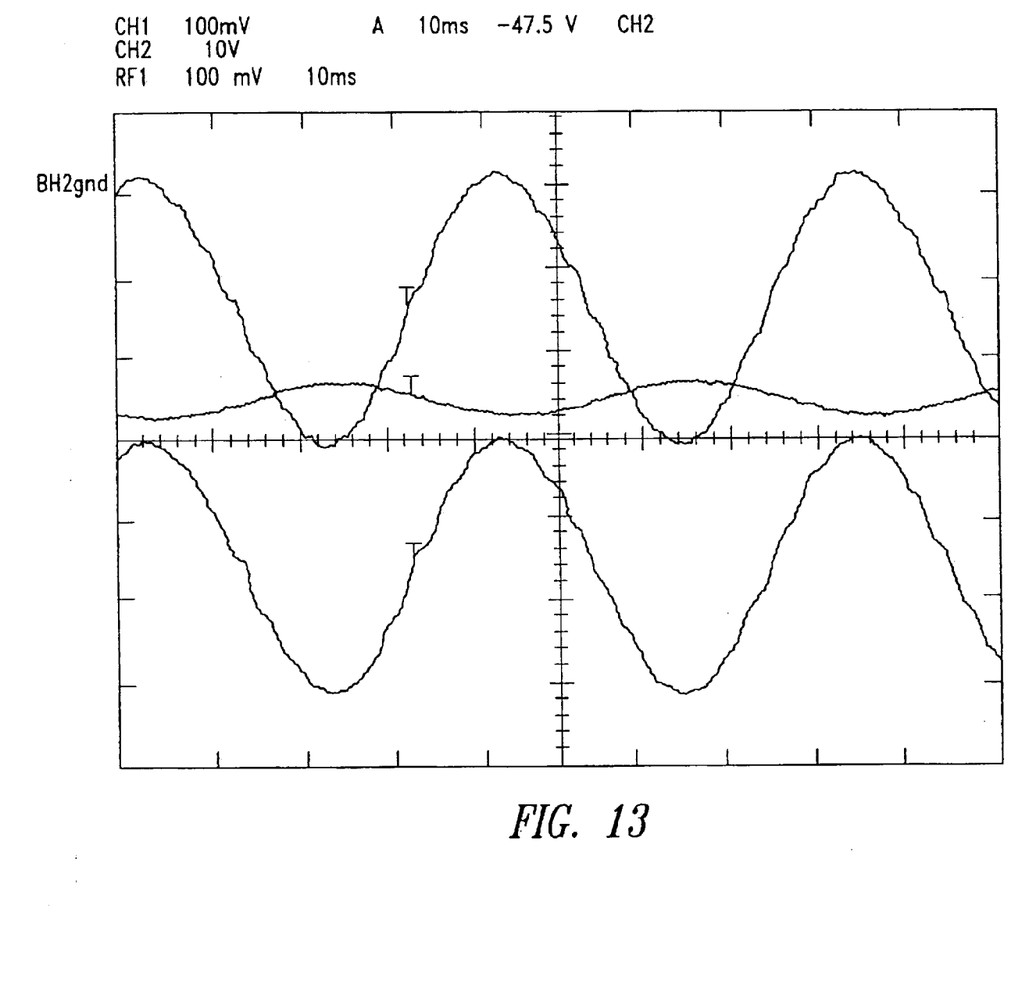

In FIG. 13 the voltages across the diode D1, the capacitor C1 and the Ring wire are shown as configured in the embodiment shown in FIG. 9.

Figure 14:
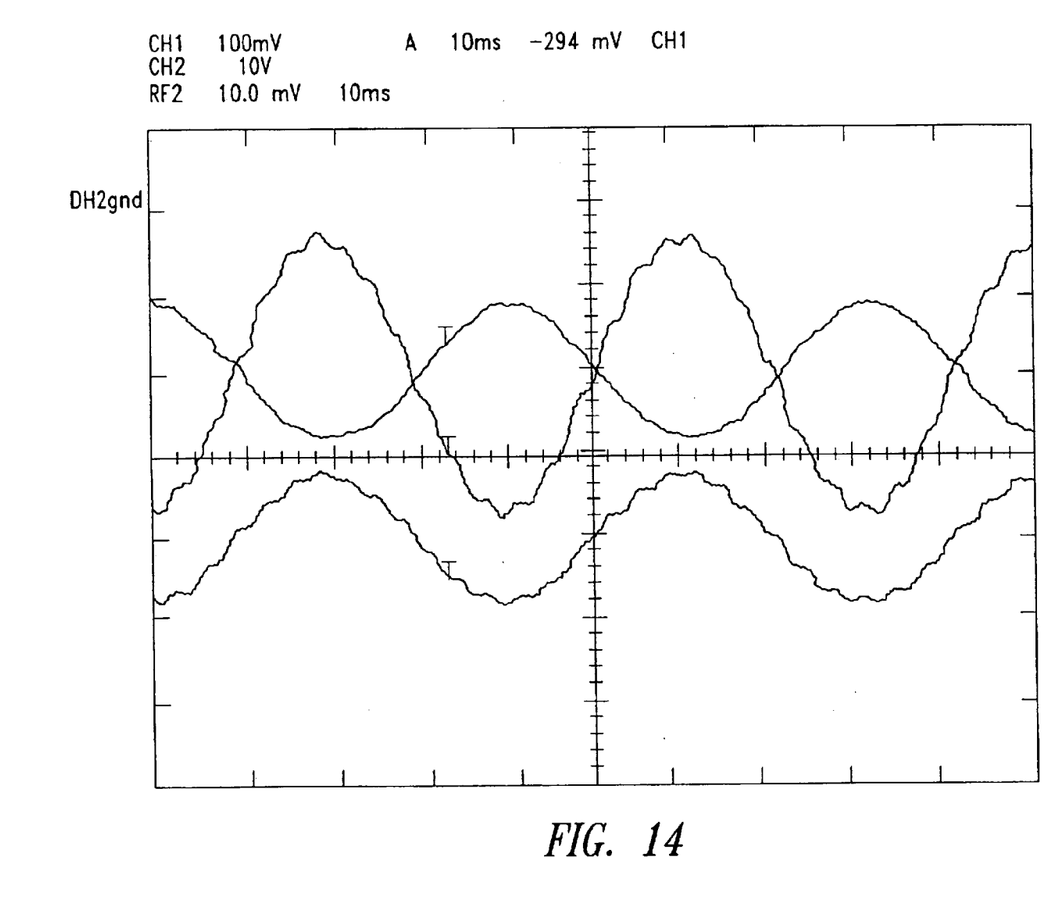

FIG. 14 shows the waveforms associated with the circuit of FIG. 9, similar to FIG. 13, but using a smaller amplitude (about half as large) for the 25 Hz modulating current being injected into the PWM stream generator. It can be seen that the DC voltage shift is a function of the signal amplitude.

A combination of these waveforms reveals that each involved component never attains a higher value than the battery voltage being applied, thereby complying with the technology standards. It can be appreciated that the compound DC/AC voltage produced on the Ring wire largely exceeds this limit (twice as high as VBAT) and complies with regulations requiring a battery DC mean value for the ring signal generated.

Advantageously in this invention, the circuit provided can be fully integrated with its ring signal injecting function (with the sole exception of the capacitor) for improved reliability and lower cost, and allows a compound (AC and DC) ring signal to be sent to the telephone line, which largely exceeds the voltage limits of the technology itself, with evident benefits in terms of chip size and cost.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claimed is:

1. A subscriber telephone system comprising:
    a first driver circuit coupled to a tip terminal;
    a second driver circuit coupled to a ring terminal;
    a network coupled between the second driver circuit and the ring terminal, the network including a capacitor and a diode limiter coupled in parallel between an output of the second driver circuit and the ring terminal, and structured to minimize the overall ring voltage while maintaining a desired battery mean value.

2. The subscriber telephone system according to claim 1, wherein said diode limiter comprises a MOS transistor.

3. The subscriber telephone system according to claim 1, further comprising an external filter coupled to the tip and ring terminals and structured to extract a sinusoidal ringer signal.

4. A subscriber telephone circuit including a voltage shifting network coupled between an output driver and a ring terminal, the voltage shifting network comprising:

a diode having a first terminal coupled to the output driver and a second terminal coupled to the ring terminal; and a capacitor having a first terminal coupled to the output driver and a second terminal coupled to the ring terminal.

5. The subscriber telephone circuit of claim 4 further comprising:

a resistance coupled between the second terminal of the diode and a supplied voltage.

6. The subscriber telephone circuit of claim 5 wherein the supplied voltage is a negative voltage.

7. The subscriber telephone circuit of claim 5 further comprising a second diode coupled between the supplied voltage and the resistance.

8. The subscriber telephone circuit of claim 4 wherein the diode is formed by an MOS transistor.

9. The subscriber telephone circuit of claim 8 wherein the MOS transistor has a gate electrode coupled to a switch controller.

10. The subscriber telephone circuit of claim 8 wherein the MOS transistor is PMOS.

11. A subscriber telephone circuit including a voltage shifting network, the subscriber telephone circuit comprising:

a first SLIC driver coupled to a ring terminal;

a second SLIC driver coupled to a tip terminal;

a first ringing driver coupled to a first inductive-capacitive network and to the ring terminal; and a second ringing driver coupled to a second inductive-capacitive network and to the tip terminal.

12. The subscriber telephone circuit of claim 11 wherein the first ringing driver is coupled through a first inductor to the ring terminal.

13. The subscriber telephone circuit of claim 12 wherein the ring terminal is coupled through a capacitor to a ground reference voltage.

14. The subscriber telephone circuit of claim 11 wherein the first ringing driver and the second ringing driver are structured to only be active during a ringing function, and are controlled by a level driver interface that is structured to receive a driving signal.

15. The subscriber telephone circuit of claim 14 wherein the driving signal is a pulse width modulation signal.

* * * * *